US009435325B2

(12) United States Patent
Boeing et al.

(10) Patent No.: US 9,435,325 B2
(45) Date of Patent: Sep. 6, 2016

(54) TRANSPORTABLE FLUID PIPELINE SYSTEM AND CONTROL

(71) Applicant: DRS Sustainment Systems, Inc., St. Louis, MO (US)

(72) Inventors: Erika Boeing, O'Fallon, MO (US); Matthew Wootton, O'Fallon, MO (US); Chris Nissman, Tucson, AZ (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 423 days.

(21) Appl. No.: 13/932,293

(22) Filed: Jul. 1, 2013

(65) Prior Publication Data
US 2015/0005954 A1 Jan. 1, 2015

(51) Int. Cl.
| | |
|---|---|
| G05B 13/02 | (2006.01) |
| G06F 19/00 | (2011.01) |
| G05D 11/00 | (2006.01) |
| F04B 17/03 | (2006.01) |
| F04B 17/05 | (2006.01) |
| F04B 49/02 | (2006.01) |
| F04B 49/06 | (2006.01) |
| E03B 5/00 | (2006.01) |
| E03B 1/00 | (2006.01) |
| F17D 3/00 | (2006.01) |

(52) U.S. Cl.
CPC ............... *F04B 17/03* (2013.01); *F04B 17/05* (2013.01); *F04B 49/02* (2013.01); *F04B 49/06* (2013.01)

(58) Field of Classification Search
CPC ........ F04B 17/03; F04B 17/05; F04B 49/06; F04B 49/02
USPC ......... 700/282, 284, 29, 108, 109, 174, 182; 137/565.11, 624.11, 605
See application file for complete search history.

(56) References Cited

U.S. PATENT DOCUMENTS

| | | | |
|---|---|---|---|
| 3,917,436 A | 11/1975 | Dower | |
| 5,540,555 A | 7/1996 | Corso et al. | |
| 5,615,696 A * | 4/1997 | Lawler | B08B 3/024 134/104.2 |
| 5,742,500 A | 4/1998 | Irvin | |
| 6,045,332 A | 4/2000 | Lee et al. | |
| 6,178,393 B1 * | 1/2001 | Irvin | F04D 15/0066 700/282 |
| 6,419,841 B1 | 7/2002 | Snodgrass et al. | |
| 6,491,060 B2 | 12/2002 | Struthers | |
| 6,811,382 B2 | 11/2004 | Buchanan et al. | |
| 6,997,642 B2 * | 2/2006 | Bishop, Jr. | A01B 45/02 137/78.3 |
| 7,720,574 B1 * | 5/2010 | Roys | G01F 15/063 700/281 |

(Continued)

OTHER PUBLICATIONS

Neaderhouser, et al., "Monitoring Electric Pump Costs in Real Time," PSIG Annual Meeting, Oct. 30, 2000, Savannah, GA, 30 pages.

(Continued)

*Primary Examiner* — Robert Fennema
*Assistant Examiner* — Thomas Stevens
(74) *Attorney, Agent, or Firm* — Kilpatrick Townsend & Stockton LLP (57) ABSTRACT

Rapidly deployable and reconfigurable fluid pumping systems may include a central controller communicatively coupled with one or more local pumping stations connected with a fluid pipeline. The local pumping stations may include at least one pump, and a local controller in communication with the central controller configured to monitor each device of the local pumping station. The local controllers may also provide individual control of each device within the local pumping station.

7 Claims, 8 Drawing Sheets

(56) References Cited

U.S. PATENT DOCUMENTS

| | | | |
|---|---|---|---|
| 8,371,379 B2 | 2/2013 | Parkinson | |
| 8,594,851 B1* | 11/2013 | Smaidris | G05D 9/12 137/101.19 |
| 8,793,023 B2* | 7/2014 | Vanderlaan | E02F 9/207 700/275 |
| 2004/0193326 A1* | 9/2004 | Phillips | B67D 1/1204 700/282 |
| 2006/0009881 A1* | 1/2006 | Ferber | G05D 7/0647 700/282 |
| 2006/0183422 A1* | 8/2006 | Defosse | H04B 5/02 455/41.1 |
| 2008/0082215 A1* | 4/2008 | McDowell | F17D 3/01 700/282 |
| 2009/0093915 A1 | 4/2009 | Parkinson | |
| 2009/0292400 A1* | 11/2009 | Wiklund | G01F 1/363 700/282 |
| 2010/0180954 A1* | 7/2010 | Hagler | F16K 27/07 137/14 |
| 2010/0217443 A1* | 8/2010 | Hagler | F16K 31/042 700/282 |
| 2010/0288493 A1 | 11/2010 | Fielder et al. | |
| 2010/0307147 A1* | 12/2010 | Ivy | F03G 3/00 60/415 |
| 2011/0081586 A1* | 4/2011 | McAlister | C25B 11/03 429/422 |
| 2011/0251728 A1 | 10/2011 | Batho et al. | |
| 2011/0276187 A1* | 11/2011 | Ciglenec | E21B 49/10 700/282 |
| 2013/0030577 A1* | 1/2013 | Jarrell | F17D 5/00 700/282 |
| 2013/0336721 A1* | 12/2013 | McBride | E21D 11/00 405/55 |
| 2014/0156089 A1* | 6/2014 | Alstrin | G05D 7/0635 700/282 |
| 2014/0163749 A1* | 6/2014 | Phillips | G05D 7/0676 700/283 |
| 2014/0260246 A1* | 9/2014 | Fisher | F03G 6/005 60/641.2 |
| 2014/0265326 A1* | 9/2014 | Allen | F01D 15/10 290/7 |

OTHER PUBLICATIONS

Kotina, et al., "Multi-Agent Control System for a Municipal Water System," 5$^{th}$ WSEAS Int. Conf. on Artificial Intelligence, Knowledge Engineering and Data Bases, Feb. 2007, 6 pages.

* cited by examiner

TRANSPORTABLE FLUID PIPELINE SYSTEM AND CONTROL

TECHNICAL FIELD

The present technology relates to pumping processes and equipment. More specifically, the present technology relates to configurable and controllable fluid pipeline systems.

BACKGROUND

In locations around the world, a base of operations or localized establishment may require delivered water or additional water over that readily available. Surveying operations may determine a useful body of water located hundreds of miles away or more. In order to provide that water to the localized establishment, pumps, piping, and a variety of additional equipment may be needed for installation and use. However, terrain profiles may limit or prevent direct delivery of water, or may require extensive construction operations in order to provide the water from the source.

Additionally, controlling the set of equipment provided along the terrain may require extensive control schemes and controllers across the entirety of the delivery system. Each piece of equipment, e.g. the pumps along way, may require manual tuning in order to address the specific requirements at each position along the terrain. For example, a pump being used to deliver water through piping running up a hill will require additional power over another pump delivering the water down the hill. Often to ease installation, similar pumps and equipment are used across the entirety of the delivery system, which may reduce overall system efficiency and increase operational costs if not operated with an advanced control system. As an alternative to manual tuning, a robust central controller may be needed to monitor and deliver instructions to each controller along the way. This may require control wiring to be run across the entire delivery path so that monitoring, control, and data collection can be provided. As such, the wiring required across the entire system may need to be shielded multi-wire configurations, and additional slave controllers may be needed at every position. Such control wiring and additional devices may add further expense to the operation.

Thus, there is a need for improved system components and control mechanisms for fluid delivery systems that may ease installation and control, and reduce cost for both installation and operation. These and other needs are addressed by the present technology.

SUMMARY

An exemplary fluid pumping system may include a central controller and a local pumping station coupled with a fluid pipeline. The local pumping station may include at least one pump, as well as a local controller in communication with the central controller. The local controller may be configured to monitor each device of the local pumping station and provide individual control to each device within the local pumping station. The local controller may be further configured to transmit information to the central controller and receive instructions from the central controller.

Fluid pumping systems according to disclosed embodiments may further include a plurality of local pumping stations coupled in series with the fluid pipeline. Fluid pumping systems of the present technology may also include at least one engine coupled with the at least one pump. The fluid pumping systems may also include at least one generator coupled between the at least one engine and the at least one pump, which may be configured to allow the at least one engine and at least one pump to operate at different speeds. Exemplary generators may be selected from the group consisting of an electric motor and a hydraulic pump.

The fluid pumping systems may still further include a plurality of engines and generators coupled with the at least one pump. The fluid pumping systems may also include an energy storage device coupled with the at least one pump, and the energy storage device may be configured to provide energy to the at least one pump for operation. The energy storage device may be further configured to store received energy. Exemplary energy storage devices may be selected from the group consisting of a hydraulic energy storage device and an electrical energy storage device. Local controllers of the present systems may include a wireless controller. The fluid pipeline to which exemplary pumping stations are coupled may include at least one section of a flexible piping. The flexible piping may include an integrated wire configured to communicatively couple the local controller with the central controller.

Methods are also described for operating a local pumping station. Exemplary pumping stations may include at least one pump within a fluid pumping system with a local controller communicatively coupled with the local pumping station. The methods may include receiving an instruction from a remotely located central controller to provide a desired output state for the pump. The methods may further include determining, with the local controller, one or more operational characteristics to be modulated to produce the desired output state for the pump. Determining the operational characteristics with the local controller may include determining a required input power for the pump to produce the desired output state of the pump. The determination may further include instructing at least one of an engine and/or an energy storage device, located as part of the local pumping station, to provide the required input power for the pump. As would be understood, an engine in such a system may not be limited to particular devices, and my include one or more devices providing useful energy to the system in one form or another.

The local controller may further determine a fuel-efficient setpoint for the at least one engine that provides the required input power for the pump. The local controller may then instruct the engine to operate at the determined fuel-efficient setpoint. If the local pumping station includes a plurality of engines, the local controller may determine a fuel-efficient setpoint for each of the plurality of engines that in combination provides the required input power for the pump. The local controller may then instruct the plurality of engines to operate at the determined fuel-efficient setpoints. In disclosed embodiments, the plurality of engines may include at least two differently sized engines. The methods may also include the local controller determining available output energy from one or more energy storage devices. The local controller may then determine a fuel-efficient setpoint for the at least one engine that provides an amount of output power from the engine that is below the required input power for the pump. The local controller may then determine and ensure that the available output power from the energy storage device provides at least the difference between the amount of output power from the engine and the required input power for the pump. The local controller may then instruct the engine to operate at the determined fuel-efficient setpoint, and instruct the energy storage device to provide the make-up power to achieve the required input power for the pump.

The methods may also include during operation of the local pumping station determining local pumping station characteristics of the pump and/or other devices at a series of predetermined times with the local controller. The local controller may then compare the local pumping station characteristics from each subsequent time in the series of predetermined times with the local pumping station characteristics from one or more of the previously determined times of the series in order to determine if a station event has occurred. A station event may include a change in one or more of the pumping device characteristics beyond a threshold range based on the operational setpoint. The methods may also include the local controller sending at least one set of the local pumping station characteristics to the remotely located central controller at predetermined time intervals. Local pumping station characteristics may additionally be transmitted immediately upon the determination of the occurrence or possibility of the occurrence of a station event. The local pumping station characteristics may include at least one or more of the input flow rate to the pump, the output flow rate from the pump, the input power to the pump, the input fluid pressure to the pump, and the output fluid pressure from the pump. The methods may still further include receiving an instruction from the central controller to provide additional local pumping station characteristics to the central controller.

Such technology may provide numerous benefits over conventional systems and techniques. For example, the systems may utilize integrated wiring or wireless controls to facilitate setup and configuration. Additionally, the fluid pumping systems may utilize components and algorithms configured to improve system efficiency and performance. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the Figures are for illustrative purposes, and are not to be considered of scale or showing all included components unless specifically stated to be as such.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

The present technology includes fluid pumping systems and components, as well as methods of operating fluid pumping systems. The fluid pumping systems may be rapidly deployable and reconfigurable in order to provide flexibility for use over a variety of terrains. By utilizing intelligent local controllers, the system may take advantage of low-bandwidth communication between the local controllers and the central controller.

The systems also may utilize integrated pumping stations incorporating all of the components used for improved deployment. By packaging segments of components, the system can be installed over a variety of terrains without the often laborious tasks associated with conventional piping system installation configurations. The systems may further utilize a semi or fully flexible pipe with the pumping stations which provides further installation flexibility, because straighter routes, or routes with more difficult topography may be more easily traversed with the present systems. In an exemplary design traversing hundreds of miles, the system may be delivered utilizing a series of the described pumping stations coupled with one another utilizing a flexible pipe. Some or all of the distance may utilize these pumping stations, and the pumping stations may be used for the final sections of the delivery system. For example, the pumping stations may be deployed to begin the fluid delivery. As the system is extended for additional length, local pumping stations may be removed and backfilled with different equipment, and the pumping stations added to the front end of the delivery system. As such, the delivery system may be installed much more rapidly over conventional systems. Moreover, because of the flexible piping and the control schemes to be discussed further below, the pumping stations may be utilized and reconfigured almost regardless of terrain profile.

In one exemplary control scheme, the central controller may send simple commands, such as a desired flow rate of the system, and then the local controller at individual pumping stations may utilize this output request to determine the component setpoints for each device included in the specific pumping station. Because lengths of piping or terrain associated around a particular pumping station may differ between pumping stations, each local controller may determine different operational setpoints as best suited for that particular pumping station. As the pumping stations are reconfigured, the local controllers may adjust operational parameters based on the new terrain profile, flow, distance, and delivery requirements of the new position. By utilizing intelligent local controllers, data transfer between the central controller and the local controllers may be reduced, which may allow for reduced bandwidth communication throughout the system.

Although the remaining disclosure will routinely identify specific fluid pipeline configuration and control schemes, it will be readily understood that the systems and methods are equally applicable to a variety of technologies that may benefit from reduced bandwidth control between global and local controllers, as well as technologies that may benefit from decoupled pumping and/or engine schemes as discussed herein. For example, aspects of the present technology may be useful in multi-use pumping stations. Pumping stations which require different pressure or flow outputs for different scenarios may make use of the present technology with multiple input sources designed around each operating point in order to improve fuel efficiency at each operating point. Additionally, vehicular drive trains may utilize aspects of the present technology with multiple prime mover components in a series hydraulic or electric hybrid architecture, with power being output independently at each wheel. Storage devices, such as those described below, may be incorporated into the system for power leveling or regenerative braking purposes. Aspects of the present technology may also be useful in power generation systems that are made to be scalable. Such systems may apply certain aspects of the disclosed concepts of multiple input sources in order to scale the power output and multiple output sources to distribute power to multiple sources and with multiple forms of energy. Accordingly, the technology should not be considered to be so limited as for use with pumping processes alone. In still another example, aspects may be utilized in a heating, ventilation, and air conditioning ("HVAC") system that encompasses an engine or engine/power storage combination that can include a variety of inputs to the engine, which may be the compressor, including electricity, steam, water, wind, etc. Such a system may experience fluctuating loads based on the season, design, or load requirements and thus multiple engines and/or energy storage devices may be used in a variety of combinations using aspects of the presently disclosed technology to increase the average energy efficiency of running the HVAC system throughout the year. If the speed required for cooling, or heating in a reversed heat pump scenario, also varies over time of operation, multiple HVAC systems could be applied using aspects of this technology to further increase efficiency.

Figure 1:
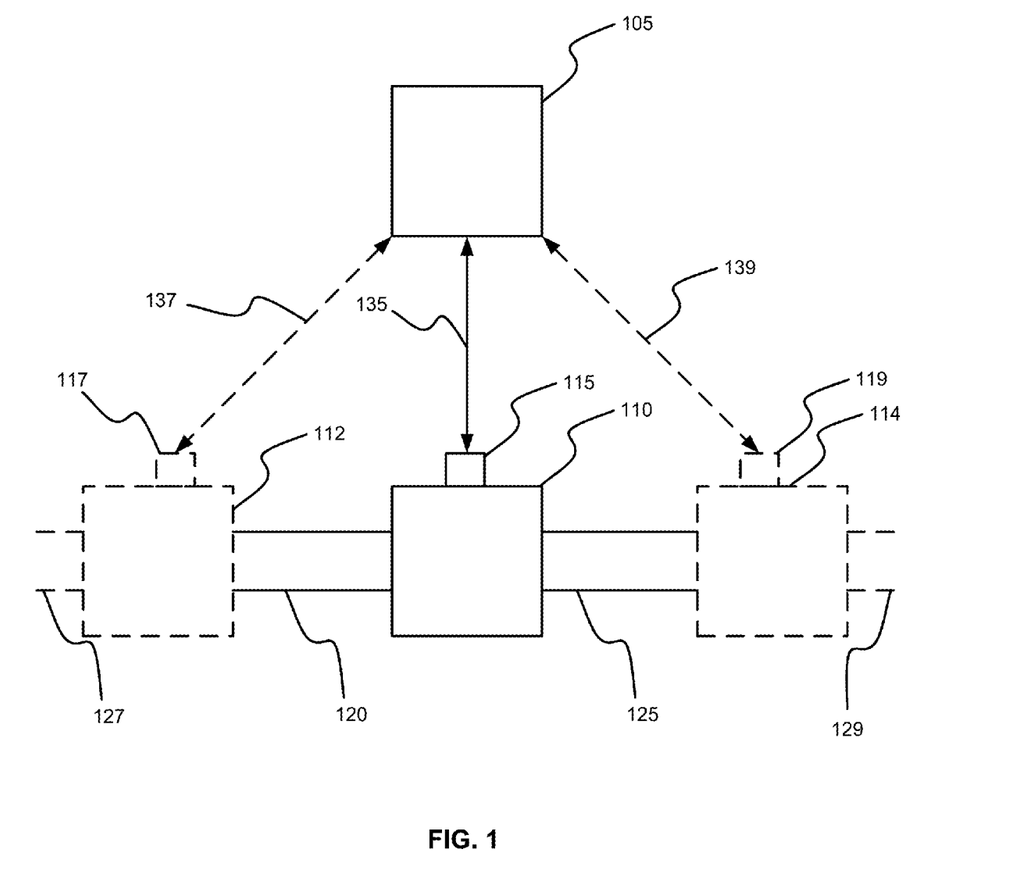
FIG. 1 shows a block diagram of components in an exemplary fluid pumping system according to embodiments of the present technology.

FIG. 1 shows a block diagram of components in an exemplary fluid pumping system according to embodiments of the present technology. In the figure, a central controller 105 is in communication with one or more local controllers, such as local controller 115, in order to control the performance of one or more local pumping stations, such as pumping station 110. The system may optionally include additional local pumping stations 112, 114, or a plurality of local pumping stations coupled in series with a fluid pipeline. Local pumping station 110 may be coupled with a fluid pipeline, including inlet section 120 and outlet section 125. Local pumping station 110, or each local pumping station may include one or more system components. Local pumping station 110 may include at least one pump, as well as a local controller 115 in communication with the central controller 105. Local controller 115 may be configured to monitor each device of the local pumping station 110 as well as to provide operational instructions or individual control to each device within the local pumping station 110. Local controller 115 may be further configured to transmit information to the central controller 105 and receive instructions from the central controller 105.

The central controller 105 may be communicatively coupled 135 with each local pumping station through either wired or wireless controls. For example, a wired control scheme may be coupled with each local controller by wiring coupled with the inlet piping 120 and outlet piping 125 coupled with each local pumping station 110. Continuing the example, flexible piping sections 120, 125 may include wiring connected to, coupled with, or embedded in the piping itself. For example, the flexible piping sections may include an integrated wire configured to communicatively couple the local controllers with the central controller. Because the present technology may utilize a low bandwidth control scheme, such incorporated wiring may be utilized to transmit and receive control signals and data between the central controller 105 and the local controllers 115. Additionally, central controller 105 may be wirelessly coupled with local controller 115 and data receipt and transmission may occur wirelessly from individual pumping stations to the central controller. Such a low-bandwidth control scheme may benefit installation of the present technology, because as the local pumping stations are deployed they may be incorporated, reconfigured, or removed without concern for additional control wiring.

Additional benefits of the technology may be recognized in configurations having multiple local pumping stations. As illustrated in FIG. 1, a central controller 105 may be communicatively coupled with the plurality of individual pumping stations 110, 112, 114. Central controller 105 may use wired or wireless technology to interact with local controllers 115, 117, 119. For example, wireless signals 135, 137, 139 may allow the central controller 105 and local controllers to transmit and receive instructions and data for system operation. The location of individual pumping stations may be based on the terrain where the equipment in each station, such as the pumps, may be used. For example, pumps may be required at particular intervals in order to provide the required fluid flow rate. Additionally, the local pumping stations may be configured to maintain a particular fluid pressure through the system.

The system may include piping, such as flexible piping, coupling the individual pumping stations. The number of pumping stations used may be based on the distance across which the fluid must be delivered, and may include greater than, less than, or about 1, 2, 3, 5, 10, 15, 20, 30, 40, 50, 75, 100, 150, 200, etc. or more pumping stations. The pumping stations may be positioned tens of feet, hundreds of feet, thousands of feet, or miles apart, and may be determined based on the terrain profile or the particular pumps being used, for example. As shown in FIG. 1, a plurality of local pumping stations are coupled in series with a fluid pipeline, although parallel configurations or other redundancies may be incorporated. Inlet piping 127 from a source, and outlet piping 129 to a final delivery position may include flexible or straight piping, or some type of combination. Intermediate piping 120, 125 may be a semi-flexible or flexible piping allowing the system to account for a variety of terrain profiles. Dispersed across the system, local pumping stations 110, 112, 114 may include a variety of equipment, as will be discussed further below, for the actual delivery of the fluid across the system. Each local pumping station may include a local controller 115, 117, 119 utilized to monitor and control each of the devices included within the local pumping station.

In operation, central controller 105 may be manually instructed to provide or may individually determine that a particular flow rate is required from the system. Central controller 105 may transmit an instruction along communication paths 135, 137, 139 indicating that each of the local pumping stations 110, 112, 114 should provide the required flow rate. Local controllers 115, 117, 119 may receive the instruction and individually determine the parameters by which the flow rate may be produced by the local pumping stations. For example, if local pumping station 110 is at an elevation below local pumping station 114, when local controller 115 initiates flow from pumping station 110, the flow rate may initially be below the flow rate required. Additionally, if local pumping station 114 is at an elevation above the final elevation, and will be flowing water down to the final elevation, when local controller 119 initiates local pumping station 114, the flow rate may additionally be higher than the required flow rate. Local controller 115, while monitoring the parameters of local pumping station 110, may identify that the flow rate is below the requested flow rate of the system. Accordingly, local controller 115 may individually determine the ways by which flow from pumping station 110 may be increased, and local controller 119 may determine ways by which the flow rate from pumping station 114 may be decreased. As such, central controller 105 may not be required to provide any further instruction to the local controllers in order to adjust and modify local pumping station parameters as may be required based on terrain profile, piping length, etc. to produce the overall flow required by the system. Consequently, because the central controller 105 and local controllers may utilize a reduced bandwidth for communication between the devices, wireless communication or low-bandwidth wiring may be used throughout the system. Further control schemes and operational characteristics of the present technology will be discussed in more detail with the methods below.

Figure 2:
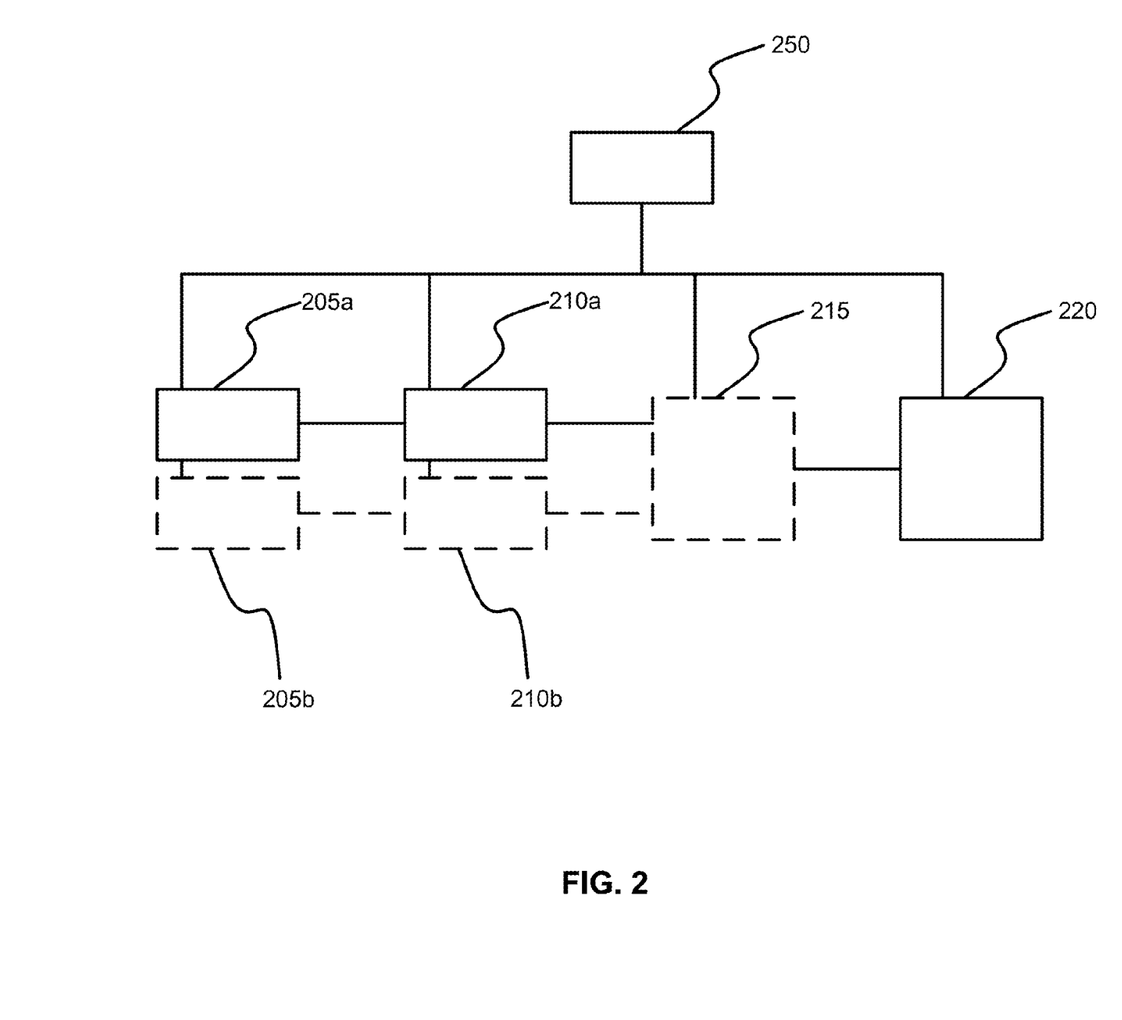
FIG. 2 shows a block diagram of components in an exemplary local pumping station according to embodiments of the present technology.

Turning to FIG. 2, components of a local pumping station, such as local pumping station 110 as discussed above, are illustrated in block diagram format according to embodiments of the present technology. The pumping stations may be designed in order to provide 1, 2, 3, etc. up to a variable number of operating points. The operating points may be based on flow rate, pressure, or any other parameter. For example, the system may be designed to operate anywhere from less than to about 50 gpm up to about 5,000 gpm or more. The system may further be configured to operate at any range within this stated range, such as from about 50 gpm to about 2,000 gpm, about 100 gpm to about 1000 gpm, about 200 gpm to about 800 gpm, etc. Additionally, the system may be designed to operate anywhere from less than or about 10 psi up to about 2000 psi or more. The system may further be configured to operate at any range within this stated range, such as from about 10 psi to about 1000 psi, 20 psi to about 800 psi, 30 psi to about 550 psi, with boost capabilities anywhere within this stated range. As previously discussed, the local pumping stations may include at least one pump 220 for maintaining system flow along the delivery route. Pumps useful in the present technology may include any known or future developed positive displacement, direct lift or velocity, or gravity pumps. For example, the pumps may include rotary displacement or reciprocating displacement pumps, screw pumps, hydraulic pumps, impeller pumps, centrifugal pumps, steam pumps, valveless pumps, or any number of additionally known pumps. Pump 220 may additionally include associated components such as motors, variable drives, etc., as would be understood by one of skill.

The local pumping station may additionally include at least one engine 205 coupled with the at least one pump 220. Engine 205 may be directly or indirectly coupled with pump 220 in disclosed embodiments. Engine 205 may utilize one or more of a variety of fuel sources in order to provide energy by which pump 220 may be operated. For example, engine 205 may utilize gasoline, diesel, kerosene, or any other fuel to produce an energy output, such as mechanical motion. The fluid pumping system may further include at least one generator 210 coupled between the at least one engine 205 and the at least one pump 220. Generator 210 may be utilized to decouple engine 205 from pump 220 in order to improve overall system efficiency, as will be explained in greater detail below. Generator 210 may be configured within the local pumping station specifically to allow the at least one engine 205 and at least one pump 220 to operate at different speeds. Generator 210 may include any number of generator types useful in decoupling engine 205 from pump 220, or transposing the input energy source from engine 205 to an energy source useful for pump 220. By way of non-limiting example, generator 210 may include an electric generator and/or a hydraulic pump.

As illustrated in the figure, the local pumping station a further include a plurality of engines 205 and generators 210 coupled with the at least one pump 220, and may include 2, 3, 4, 6, 10, etc. or more of each of the engines, generators, or pumps in disclosed embodiments. Although shown with direct connections between the engines and generators, it is to be understood that this is for illustration purposes only, and any couplings may be used or duplicated such as to provide system redundancy, for example. Engine 205a and engine 205b may be similar or different engines in disclosed embodiments. For example, the engines may utilize similar or different fuel sources, or be of different sizes in disclosed embodiments. Similarly, generator 210a and generator 210b may be similar or different generators in disclosed embodiments. For example, the generators may both be electric or hydraulic, or one or more generators may be electric and one or more generators may be hydraulic in disclosed embodiments. The generators 210 may be coupled with any or all of the engines 205 utilized in the local pumping stations. In one example, at least one hydraulic pump may be utilized as one or more of the generators 210 in order to provide a starting means for one or more of the engines 205. For example, if electric generators are utilized within the fluid pumping station, an additional battery pack or ignition source may be used in order to initiate operation of one or more of the engines 205. However, a hydraulic pump may be back flowed, for example, in order to initiate operation of one or more of the engines 205, which may limit the need for additional system components. The engines 205 may further be coupled with one another such that when one engine has been started in such a fashion it may be used to further initiate operation of any other component in the system.

Local pumping stations may further include one or more energy storage devices 215 coupled with the at least one pump 220. The energy storage device 215 may be configured to provide energy to the at least one pump 220 for operation, and may further be configured to store energy received from one or more of the generators 210. The type of energy storage device 215 may be selected or determined based on the energy source provided by the generators 210. For example, energy storage device 215 may include capacitors, batteries, or other electrical energy storage devices if the input to the energy storage device 215 includes an electrical input. Additionally, energy storage device 215 may include a fluid tank, such as a pressurized fluid tank or other hydraulic energy storage device, for receiving air, oil, or any other type of hydraulically useful fluid delivered from one or more of the generators 210. The energy stored in energy storage device 215 may then be used alone or in conjunction with the energy provided from any of the engines 205 or generators 210 in order to provide the input energy for the one or more pumps 220.

As discussed previously, the local pumping station may further include a local controller 250 configured to monitor and provide instructions to one or more or every device within the local pumping station. For example, the controller 250 may monitor flow rates to the station, pressures to the station, energy consumption of each device, energy efficiency of each device, etc. among any other number of parameters and characteristics of the local pumping station and individual devices. The local pumping station may still further include any number of valves or other components useful in the configuration or operation of the local pumping station, any or all of which may additionally be controlled by local controller 250.

The local controller 250 may further be configured to perform analysis and determination functions in order to maximize system or device efficiency, minimize system or device fuel consumption, or modulate start, stop, or usage of individual components within the local pumping station. For example, local controller 250 may be programmed with or may monitor engine 205 to determine specific fuel consumption of the device. Local controller 250 may then operate one or more of the engines 205 such that the engines may be operating in a more efficient manner. Such operation is explained in more detail with reference to FIG. 3 below.

Figure 3:
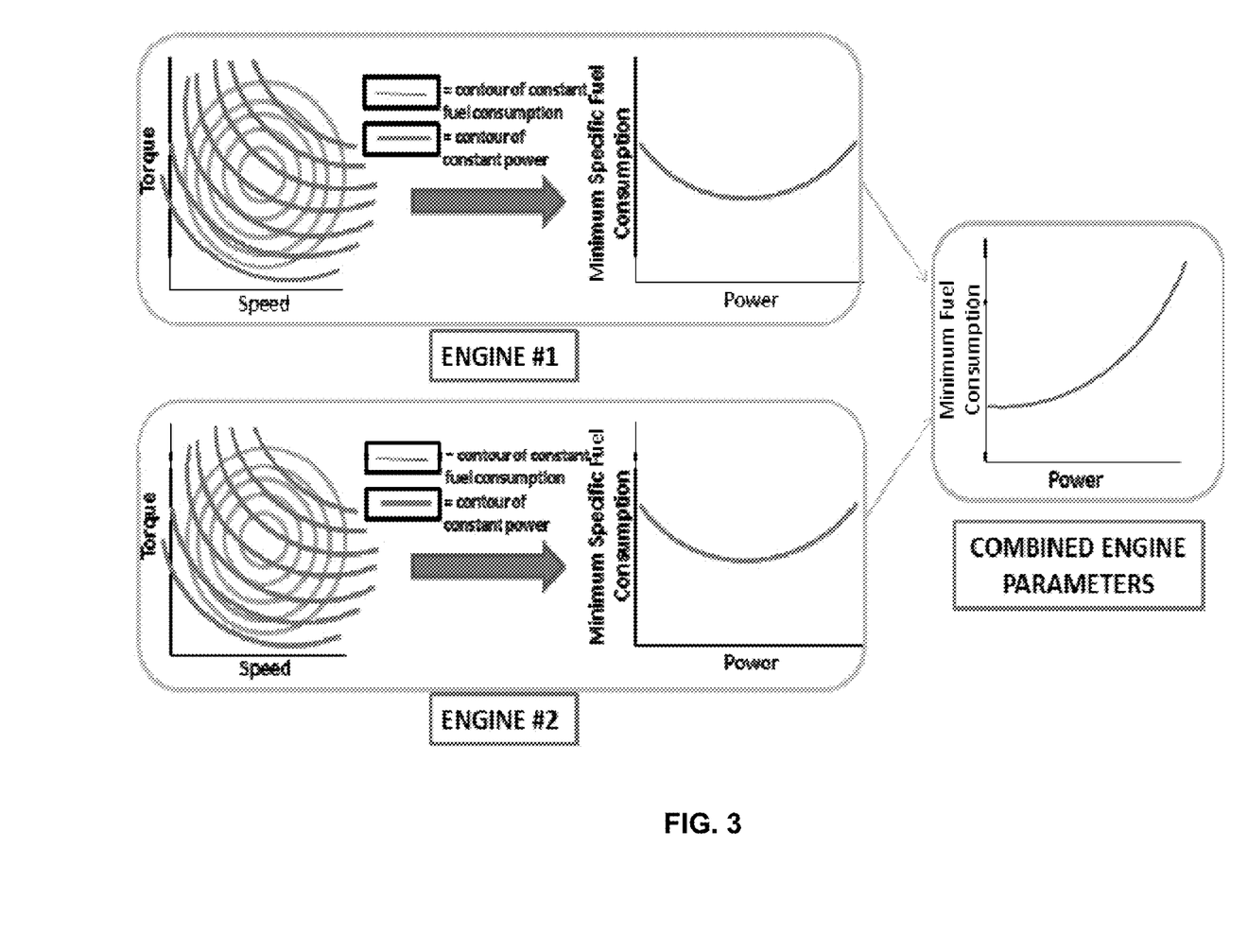
FIG. 3 shows exemplary charts detailing a process for determining minimum fuel consumption for engines according to embodiments of the present technology.

FIG. 3 shows exemplary torque/speed curves for exemplary engines as may be used within a local pumping station according to the disclosed technology. Although the example utilizes two engines, it is to be understood that any number of engines may be utilized and operated within each local pumping station. The torque/speed curves may be used to produce idealized minimum specific fuel consumption over a range of power outputs for the engine. The local controller may further monitor the engines in order to modify these parameters over time, as positions along a curve may change with extended use of the engine. If the two engines are similar, the initial curves may also be similar, although the curves may change in different ways with extended use.

Additionally, if the two engines are different the consumption/power curves may also be different. The local controller may utilize these parameters in order to determine combined parameters for the local pumping station. An exemplary system fuel consumption per output power curve for a hypothetical combination of engines is illustrated in FIG. 3. Accordingly, when the local controller receives a required output flow or power instruction from a central controller, the local controller may utilize this information in order to operate the combination of engines in the most fuel-efficient manner. In operation, the differential pressure and flow required at the final pump may determine the load on the system. The system may react to this load or changing loads by monitoring the system components and determining how to stay as close to a minimum fuel consumption position as possible while maintaining the desired output power.

For example, if one engine may produce the required output in a more efficient manner than two engines combined, the local controller may determine to operate the system as such. Additionally, the local controller may determine to use different setpoints for each engine that may utilize more efficient fuel consumption while in combination providing the required power output. Moreover, the local controller may determine to operate the one or more engines at setpoints of better fuel efficiency, despite that the produced power may be more or less than that required by the pumps. The local controller may be capable of determining that the lost power produced may be offset by the improved fuel efficiency setpoints for each engine such that overall system efficiency is still improved. Finally, if an energy storage device such as described previously is used, the local controller may further utilize this mechanism for operating the local pumping station even more efficiently. This will be discussed in greater detail with the methods below.

Figure 4:
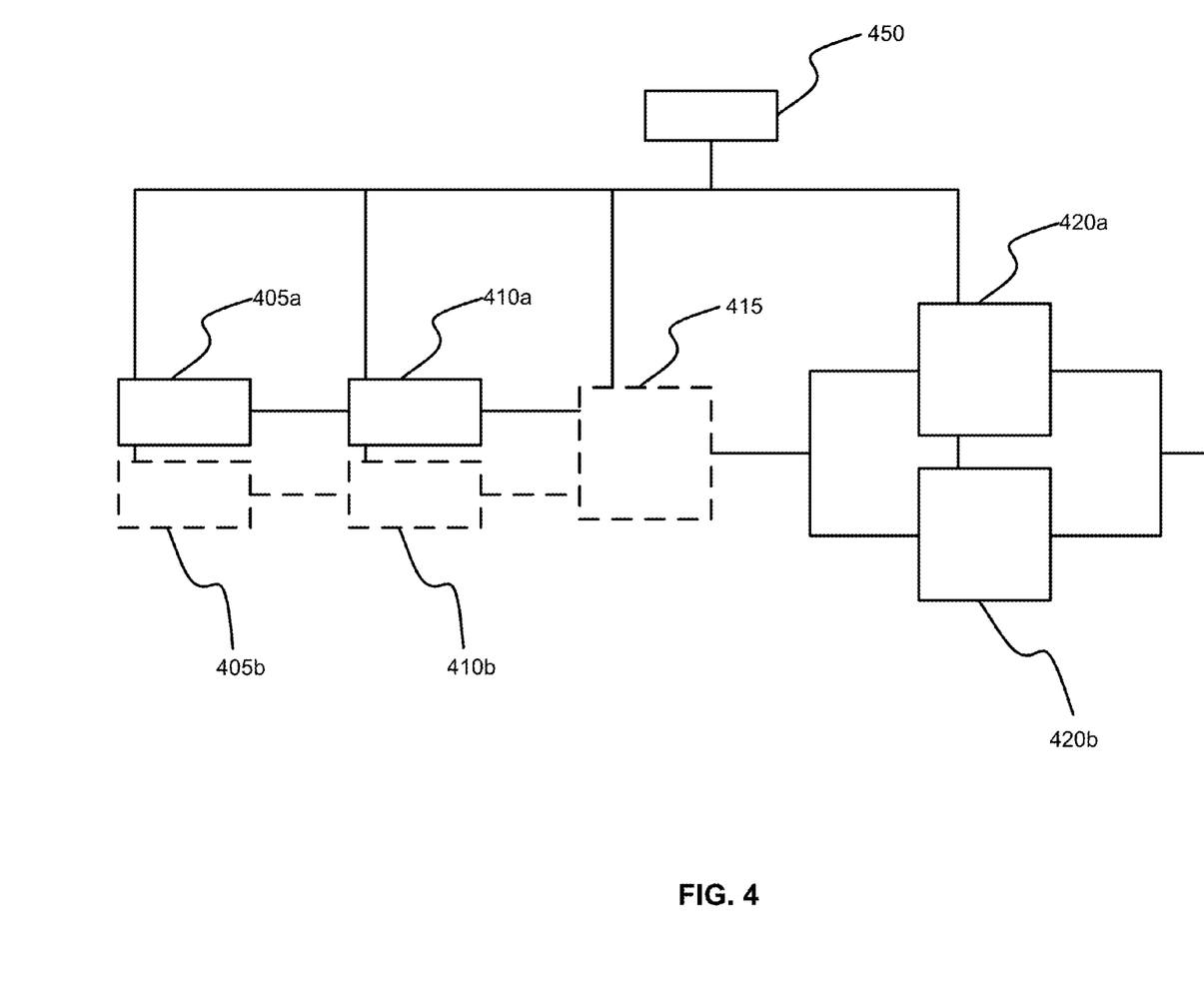
FIG. 4 shows a block diagram of components in an exemplary local pumping station according to embodiments of the present technology.

As previously discussed, the local pumping stations may include more than one pump in disclosed embodiments, an example of which is illustrated in FIG. 4, which shows an additional block diagram of certain components that may be included within individual pumping stations. The pumping station may include any of the components as previously discussed with regard to FIG. 2, and the components may include any of the sizes and designs as previously described. For example, the local pumping station may include at least one engine 405 coupled with a plurality of pumps 420a, 420b. As would be understood, in other technologies pumps 420 may include or comprise other prime mover devices, such as compressors in an HVAC design, for example. The local pumping station may further include one or more generators 410 that may be utilized to decouple engines 405 from pumps 420. The local pumping station may further include one or more energy storage devices 415, as well as a local controller 450 that may be configured to operate any or all of the components within the system. Although illustrated in parallel, is to be understood that pumps 420 may alternatively be configured in series or in any other arrangement for any number of pumps that may be useful to provide flow rate, fluid pressure, redundancy, or any other configuration or operational characteristics.

A multi-pump system, such as illustrated with respect to FIG. 4, may be useful in a variety of circumstances such as in systems in which flow changes may occur frequently and/or with a wide variance in the amount of flow required by the system. The overall system components including the additional pumps 420 may be operated in a similar fashion as described above with respect to FIG. 2, and may provide further opportunities for system efficiency savings through the operation of the multiple pumps. The pumps 420 may be similar or different sizes from one another, and may also be operated separately or in combination at efficient setpoints for the pumps as may be determined by local controller 450. An exemplary control scheme for such a system is described below with reference to FIG. 5.

Figure 5:
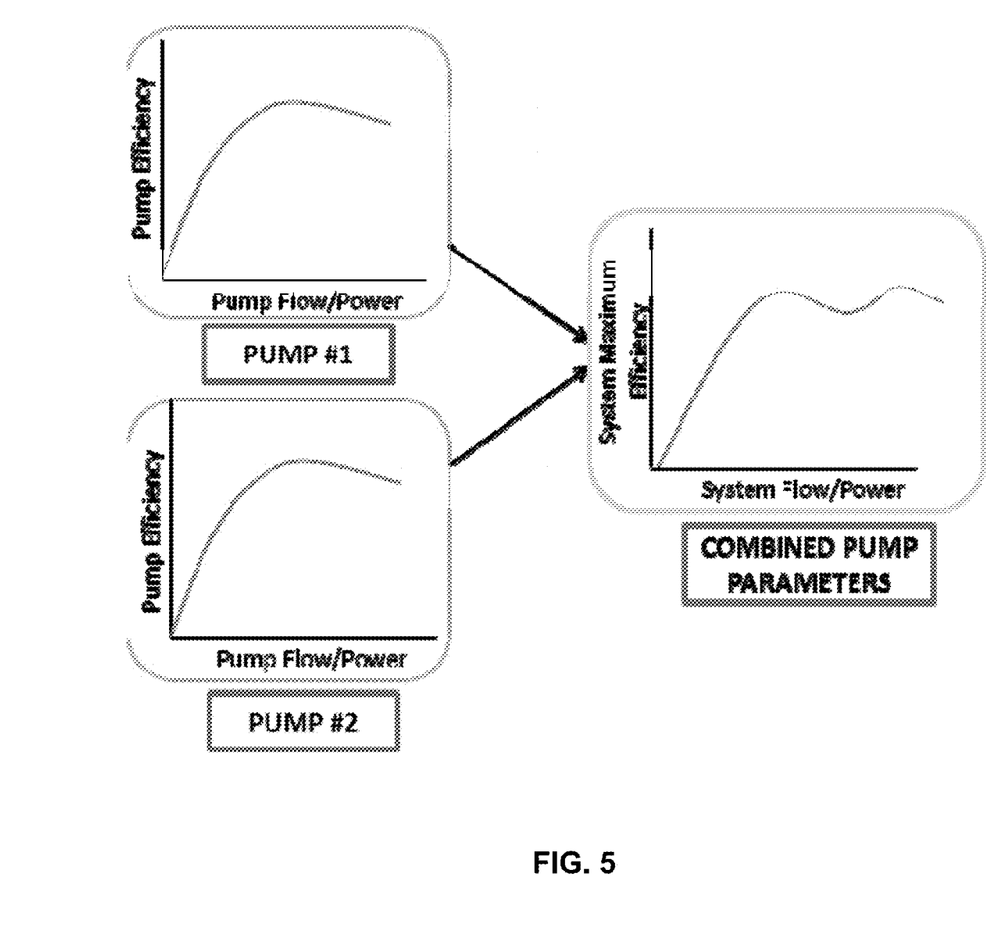
FIG. 5 shows exemplary charts detailing a process for determining maximum system efficiency for pumps according to embodiments of the present technology.

FIG. 5 illustrates hypothetical pump efficiency curves for two pumps that may be used according to the present technology. Although any particular pump may be utilized within the system described, for ease of explanation centrifugal pumps will be discussed. As may be understood by one of skill, power required for a centrifugal pump may increase relatively linearly with flow. However, efficiency does not as is illustrated in the first charts of the figure. Accordingly, setpoints of higher and lower efficiency exist for each pump. The local controller of the local pumping station may be programmed with or monitor pumps to determine the specific efficiency curves for each pump. The local controller may further modify these curves over time based on monitored changes of the pumps, which may occur through extended use of the pumps. The local controller may then use the particular efficiency information for each pump to determine combined pump parameters for overall system efficiency at the local pumping station. As illustrated in the exemplary combined parameter chart shown in FIG. 5, positions of higher and lower efficiency may be based on the individual efficiencies of each pump. For example, combined parameters may take into account the individual efficiencies of each pump. As illustrated in the combined parameters, a first position of higher maximum efficiency may be achieved through the use of one pump at a high-efficiency setpoint as opposed to both pumps at lower efficiency setpoints. As system flow is increased through the initiation of the second pump, system efficiency initially decreases based on the lower efficiency of the second pump operating at a low flow. The system efficiency then continues to increase as the second pump reaches positions of higher efficiency. Such information may be utilized by the local controller to determine the most efficient way to utilize the combination of pumps, either individually or combined, to provide the required output flow.

Figure 6:
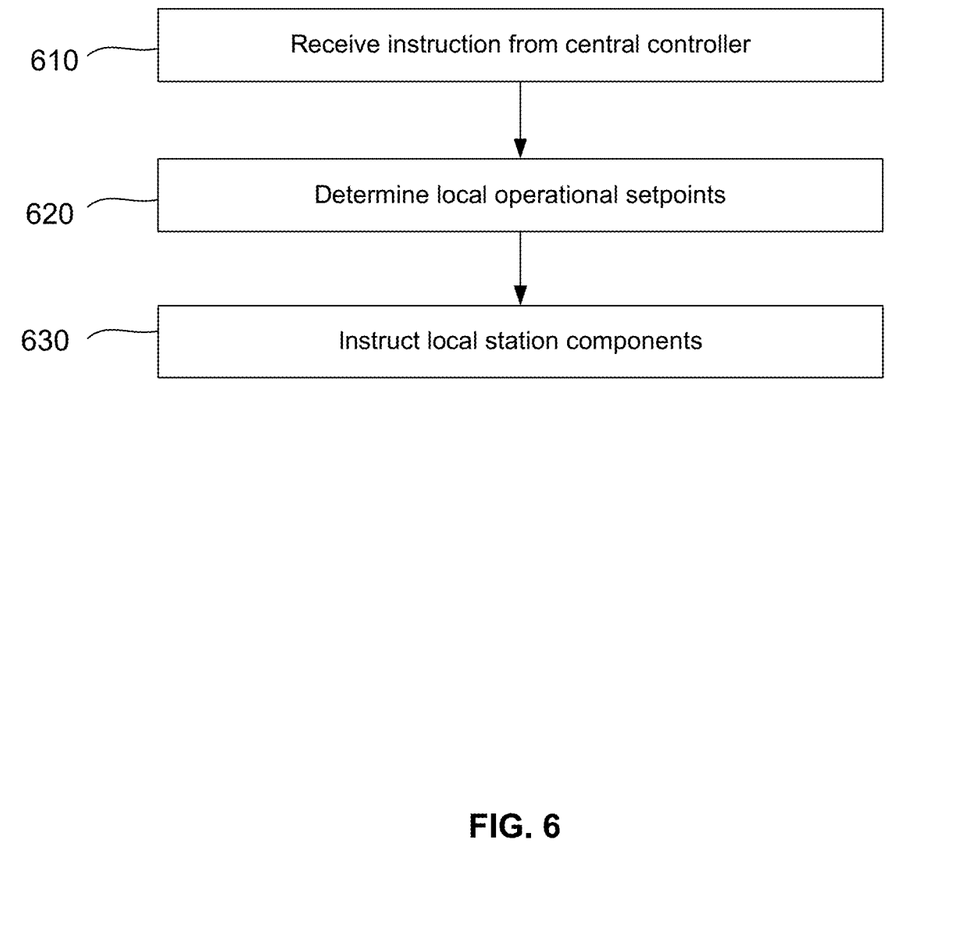
FIG. 6 shows exemplary steps in a method for controlling a fluid pumping system according to embodiments of the present technology.

The systems and components as previously described may be operated and controlled in a variety of ways. An exemplary method of operating systems according to the disclosed technology is described with reference to FIG. 6, which may be used to operate or control any of the systems or components as previously described, such as with respect to the systems and components illustrated in FIGS. 2 and 4. FIG. 6 shows selected steps for methods of operating a local pumping station including at least one pump within a fluid pumping system. The operation may be performed by a local controller communicatively coupled with the local pumping station. At operation 610, the method may include receiving an instruction from a remotely located central controller to provide a desired output state for the pump. The local controller, at operation 620, may determine one or more operational characteristics to be modulated within the local pumping station in order to produce the desired output state for the pump. The method may further include utilizing the local controller to instruct the local pumping station components at operation 630 to initiate or operate at certain setpoints in order to produce the operational characteristics determined.

The interaction between the central or global controller and the one or more local controllers at the individual pumping stations may occur in several ways. For example, the central controller may be used to monitor overall system health based on information received from the one or more local controllers. The central controller may be utilized to deliver system-wide instructions to the set of local controllers based on determinations made at the central controller or provided manually, for example. The central controller may receive environmental information such as the terrain profile along which the distribution line has been deployed, locations for each of the pumping stations along the distribution line, and information useful for the operation of system components such as, for example, the fluid pressure at which the piping connecting the local pumping stations may be safely operated. The central controller may provide some or all of this information as needed by the local controllers in order to operate effectively. The central controller may communicate with the local controllers when system flow parameters are to be changed or when a system event may have occurred. For example, if the central controller is instructed or determines that the system flow rate should be increased or decreased, it may send an instruction to all of the local controllers to modify the local conditions in order to produce the new flow rate. The transmitted information may include other useful information such as the fluid pressure under which the local pumping stations must operate. The central controller may additionally deliver outputs based on modes that may include, but are not limited to, system startup from empty, system startup from full, system shutdown, system flow rate controls, system flow rate change requests, system small leak detected, system burst detected, system blockage detected, system pump failure, system draining, etc.

The local controllers may utilize these instructions and internally determine operational parameters for some or all of the devices at the local pumping station in order to produce the requested output. Once operating, the local controllers may monitor, record, and utilize a variety of measurements for each of the devices at the local station that may be delivered from one or more sensors throughout the local station. The local controller may utilize this information to make adjustments in order to maintain the requested output, and monitor the health and efficiency of the local station components. Local controllers may be constantly monitoring local conditions and may be recording local measurements for diagnostic purposes at predetermined times, such as every fraction of a second, every second, every minute, every few minutes, every hour, etc. or longer as may be useful during the operation of the system. The local controllers may periodically send status updates or data reports back to the central controller such that the central controller may monitor overall system health across the local pumping stations. If the central controller determines that a system event may be occurring, or during modulations of system flows or other parameters, the central controller may request additional information from one or more of the local controllers for the one or more pumping stations. Situations involving a system event will be discussed with regard to FIG. 8 below. By utilizing such control schemes, required bandwidth for communication between the local controllers and central controller may be reduced. For example, such control scheme may use 95% or less of the bandwidth of a comparable system in which a central controller performs all of the discussed operations, and transmits all instructions to slave controllers at the local stations. The present control scheme may additionally use less than or about 90%, 80%, 70%, 60%, 50%, 40%, 30%, 20%, 10%, 5%, etc. or less of the bandwidth of a conventionally controlled system.

The local controller may utilize the output command from the central controller and translate this command into a set of instructions for the devices of the local pumping station. The local and global controllers may include a variety of computer technology including processors, memory, and programming as would be useful for the operations described. The controllers may additionally include logic capabilities in order to perform calculations necessary to operate the local pumping station and/or components in an efficient manner, such as described previously. This may include specific instructions such as engine rpm, pump speed, valve positions, and energy storage device use among other related commands. The local controller may also be capable of correcting system events locally. For example, if the local pumping station includes multiple engines, multiple pumps, etc., and one of the pumps fails, the local controller may utilize other pumps to produce the required output if feasible.

The local controller may determine the operational characteristics for the local pumping station devices in a variety of ways. For example, in disclosed embodiments the determination may include determining a required input power for the one or more pumps to produce the desired output state of the pumps and local pumping station. The local controller may then instruct at least one of an engine and/or an energy storage device of the local pumping station to provide the required input power for the one or more pumps.

The local controller may determine a fuel-efficient setpoint for one engine in the system that may be operated efficiently to provide the required input power for the pump. The local controller may then instruct the engine to operate at the determined fuel-efficient setpoint. The instructions for a local pumping station including more than one or a plurality of engines, for example, may include determining a fuel-efficient setpoint for each of the plurality of engines in order to provide the required input power for the pump. The local controller may then instruct each of the engines to operate at the determined fuel-efficient setpoints. The local controller may provide different setpoints for different engines, for example, in a situation in which at least two differently sized engines are included at the local pumping station.

Figure 7:
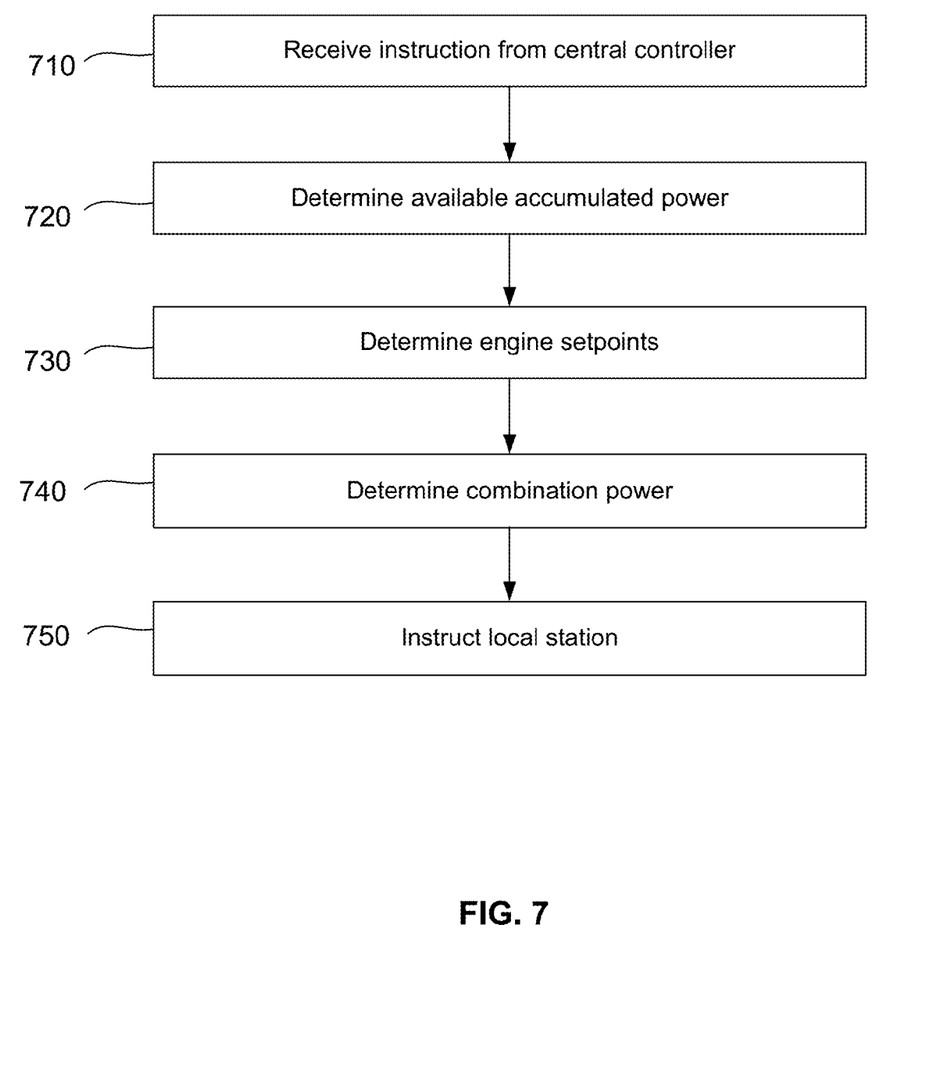
FIG. 7 shows exemplary steps in a method for controlling a fluid pumping system according to embodiments of the present technology.

Turning to FIG. 7, additional steps are shown that may be utilized to operate a local pumping station including an energy storage device in addition to the one or more engines. As discussed previously, the method may include receiving instruction from a central controller at operation 710 to provide a certain flow from the pumping station. The local controller may then determine operational characteristics for each of the engines and energy storage devices located within the local pumping station. The local controller may then determine an available output from the energy storage device based on an available accumulated power at operation 720. Depending on the energy storage device this may take several forms, such as available electric power for a capacitor bank or battery pack, as well as available fluid or pressure from a hydraulic reservoir. In conjunction or in addition to this determination, the local controller may also determine at operation 730 a fuel-efficient setpoint for at least one or more of the engines that may provide an amount of power from the engines below the required input power for the pump. The local controller may then determine and ensure at operation 740 that the available output power from the energy storage device provides at least the difference between the amount of output power from the engine or engines operating at the determined setpoints and the required input power for the pump. The local controller may then instruct the local station components at operation 750, such as instructing the engine or engines to operate at the determined fuel-efficient setpoints, and instructing the energy storage device to provide makeup power to achieve the required input power for the pump.

Such a local controller may also perform the functions necessary to charge or store energy within an energy storage device located within the local pumping station. For example, based on a request from the central controller to provide an amount of flow from the pumping station, the local controller may determine that a fuel-efficient setpoint for one or more of the engines will produce more power than is necessary to operate the pump at the required speed to produce the desired flow. Accordingly, the local controller may determine to operate the one or more engines at the determined setpoints and utilize the surplus energy to charge the energy storage device. Such calculation may further utilize variables such as the present amount of accumulated power to determine if additional storage is necessary. If not, the calculation may determine whether the overproduction of power that may be released as wasted energy is less than the efficiency savings by operating the one or more engines at more efficient setpoints, in which case the local controller may determine that it is still more efficient to operate the system in such a manner.

Figure 8:
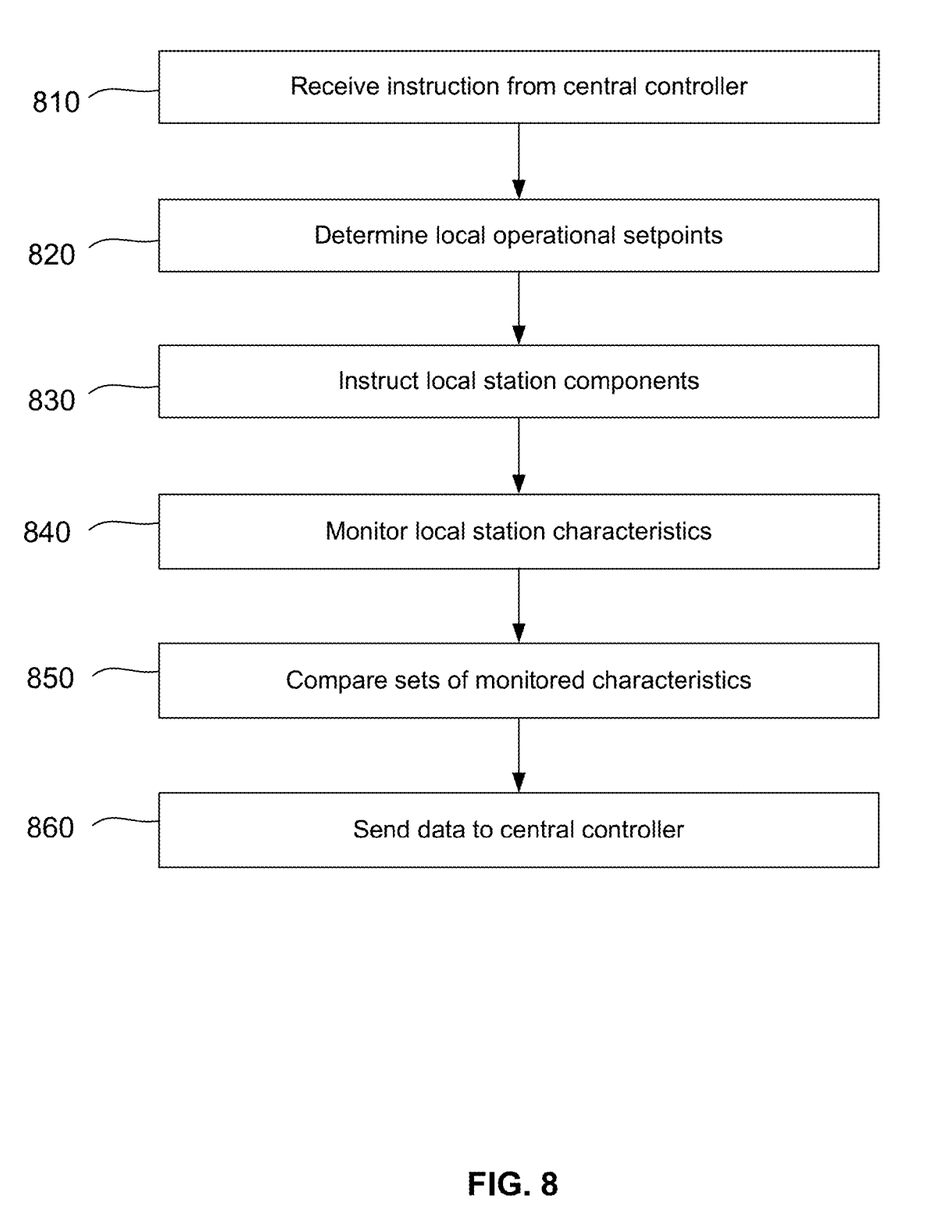
FIG. 8 shows exemplary steps in a method for controlling a fluid pumping system according to embodiments of the present technology.

Turning to FIG. 8, additional steps are shown that may be utilized to operate a local pumping station as well as monitor the station components. As discussed previously, the method may include receiving instruction from a central controller at operation 810 to provide a certain flow from the pumping station. The local controller may then determine operational characteristics at operation 820 for each of the engines and energy storage devices located within the local pumping station, and instruct the local station components accordingly at operation 830. During operation, the local controller may monitor or determine local pumping station characteristics at operation 840 at a series of predetermined times as previously discussed. The performance may be monitored for pumps, engines, energy storage devices, valves, sensors, generators, alternators, motors, as well as a variety of other parameters at the local pumping station including input flow rate to the pump, output flow rate from the pump, input power to the pump, input fluid pressure to the pump, output fluid pressure from the pump, fuel use by the engine, fuel efficiency of the engine, energy output from the engine, accumulated energy storage, and other useful parameters as may be understood by one of skill.

The local controller may compare sets of monitored characteristics over time at operation 850. For example, the local controller may compare the local pumping station characteristics for each subsequent time in the series of predetermined times with the local pumping station characteristics from the previous one or more predetermined times of the series in order to determine if a station event has occurred. Station events may include a change in one or more of the pumping or other device characteristics beyond a threshold that may be previously determined. For example, although a certain amount of fluctuation around the setpoint may occur for a number of operational characteristics, if the fluctuations exceed a determined or predetermined range, the local controller may determine that a station event has occurred. The threshold range may be any amount or percentage change from a selected setpoint. For example, the amount or percentage may be greater for devices more prone to fluctuation, and lower for devices or components that may maintain more stable readings. The method may further include sending at least one set of the local pumping station characteristics to a remotely located central controller at operation 860. The local characteristics may be sent at predetermined time intervals to limit utilized bandwidth, as well as immediately upon the determination by the local controller of the occurrence of a station event.

The central controller may receive the data after a potential system event has occurred in order to verify the event and/or further adjust system parameters. The central controller may additionally send an additional instruction received by the local controller to provide additional local pumping station characteristics to the central controller. Such control mechanisms may be used for a variety of system issues including, among other issues, leak detection. For example, a local controller monitoring pump operation may determine that output pressure to the outlet fluid pipeline has dropped below a threshold based on the initial operation parameters, which may signify a leak in the outlet piping. The local controller may send one or more sets of recorded data to the central controller for further investigation. The central controller may analyze this data, request additional data from the local controller, and/or request additional data from one or more of the other local pumping stations in order to verify whether a leak has occurred. Based on the reduced inlet fluid pressure at a subsequent local pumping station, the central controller may verify the possibility of a leak in the fluid piping coupling the local pumping stations. The central controller may then initiate an alarm or fault procedure identifying the possibility of a leak and recommending visual confirmation. Additionally, based on normal inlet fluid pressure at a subsequent local pumping station, the central controller may determine that a fluid leak is unlikely and/or recognize the possibility of a sensor malfunction at the initial fluid pumping station, for example. The central controller may then initiate appropriate action based on this assessment. As would be understood, a variety of other system health related issues may be dealt with utilizing such a control scheme.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "an engine" includes a plurality of such engines, and reference to "the pump" includes reference to one or more pumps and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or steps, but they do not preclude the presence or addition of one or more other features, integers, components, steps, acts, or groups.

What is claimed is:

1. A method of operating a local pumping station including at least one pump within a fluid pumping system with a local controller communicatively coupled with the local pumping station, the method comprising:
   receiving an instruction from a remotely located central controller to provide a desired output state for the at least one pump; and
   determining with the local controller one or more operational characteristics to be modulated to produce the desired output state for the pump, wherein the determining comprises:
      determining a required input power for the pump to produce the desired output state of the pump; and
      instructing a plurality of engines located as part of the local pumping station, to provide the required input power for the pump, wherein the instructing comprises:
         determining a fuel efficient setpoint for each of the plurality of engines that in combination provides the required input power for the pump, wherein fuel efficient is defined as a minimum fuel consumption to maintain the desired output state for the pump; and
         instructing the plurality of engines to operate at the determined fuel efficient setpoints.

2. The method of claim 1, wherein the plurality of engines includes at least two differently sized engines.

3. The method of claim 1, wherein the local pumping station further comprises an energy storage device, and wherein the instructing comprises:
   determining available output from the energy storage device;
   determining a fuel efficient setpoint for the at least one engine that provides an amount of output power from the engine below the required input power for the pump;
   determining that the available output power from the energy storage device provides at least the difference between the amount of output power from the engine and the required input power for the pump;
   instructing the engine to operate at the determined fuel efficient setpoint; and
   instructing the energy storage device to provide make-up power to achieve the required input power for the pump.

4. The method of claim 1, further comprising:
   determining, during operation, local pumping station characteristics of the pump at a series of predetermined times;
   comparing, by the local controller, the local pumping station characteristics from each subsequent time in the series of predetermined times with the local pumping station characteristics from a previous predetermined time of the series to determine if a station event has occurred, wherein the station event includes a change in one or more of the pumping characteristics beyond a threshold range; and
   sending at least one set of the local pumping station characteristics to the remotely located central controller at predetermined time intervals as well as immediately upon the determination of the occurrence of a station event.

5. The method of claim 4, wherein the local pumping station characteristics include at least one of input flow rate to the pump, output flow rate from the pump, input power to the pump, input fluid pressure to the pump, and output fluid pressure from the pump.

6. The method of claim 4, further comprising receiving an instruction from the central controller to provide additional local pumping station characteristics to the central controller.

7. A method of operating a local pumping station including at least one pump within a fluid pumping system with a local controller communicatively coupled with the local pumping station, the method comprising:
   receiving an instruction from a remotely located central controller to provide a desired output state for the at least one pump; and determining with the local controller one or more operational characteristics to be modulated to produce the desired output state for the pump, wherein the determining comprises:
  determining a required input power for the pump to produce the desired output state of the pump; and
  instructing at least one engine and energy storage devices, located as part of the local pumping station, to provide the required input power for the pump, wherein the instructing comprises:
    determining available output from the energy storage device;
    determining a fuel efficient setpoint for the at least one engine that provides an amount of output power from the engine below the required input power for the pump, wherein fuel efficient is defined as a minimum fuel consumption to maintain the desired output state for the pump;
    determining that the available output power from the energy storage device provides at least the difference between the amount of output power from the engine and the required input power for the pump;
    instructing the engine to operate at the determined fuel efficient setpoint; and
    instructing the energy storage device to provide make-up power to achieve the required input power for the pump.

* * * * *